(12) United States Patent
Li

(10) Patent No.: US 11,144,926 B2
(45) Date of Patent: Oct. 12, 2021

(54) BLOCKCHAIN-BASED RECORDKEEPING METHOD AND APPARATUS

(71) Applicant: ADVANCED NEW TECHNOLOGIES CO., LTD., Grand Cayman (KY)

(72) Inventor: Min Li, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/698,813

(22) Filed: Nov. 27, 2019

(65) Prior Publication Data

US 2020/0211024 A1 Jul. 2, 2020

(30) Foreign Application Priority Data

Dec. 29, 2018 (CN) .......................... 201811641062.5

(51) Int. Cl.
*G06Q 20/00* (2012.01)
*G06Q 20/40* (2012.01)
(Continued)

(52) U.S. Cl.
CPC ....... *G06Q 20/40145* (2013.01); *G06Q 20/18* (2013.01); *H04L 9/0637* (2013.01)

(58) Field of Classification Search
CPC .......... G06Q 2220/00; G06Q 2220/10; G06Q 2220/16
(Continued)

(56) References Cited

U.S. PATENT DOCUMENTS 10,097,356 B2   10/2018  Zinder
2012/0127315 A1*  5/2012  Heier ..................... H04N 7/181
                                                348/150
(Continued)

FOREIGN PATENT DOCUMENTS

CN       103632274 A     3/2014
CN       105931052 A     9/2016
(Continued)

OTHER PUBLICATIONS

First Search Report for Chinese Application No. 201811641062.5 dated Feb. 28, 2020 (1 page).
(Continued)

*Primary Examiner* — Dante Ravetti

(57) ABSTRACT

One or more embodiments of the application provide a method and apparatus for blockchain-based recordkeeping, which are applicable to a self-service vending terminal. The self-service vending terminal is a node of a blockchain. The method includes: obtaining first record information, wherein the first record information is generated based on identification information of a target buyer; receiving second record information, wherein the second record information is generated based on purchase live stream data associated with the target buyer; generating a target transaction based on the first record information and the second record information; and sending the target transaction to a distributed database of a blockchain, for the target transaction to be recorded in the distributed database of the blockchain in response to the target transaction being verified by nodes of the blockchain based on a consensus.

12 Claims, 2 Drawing Sheets

(51) Int. Cl.
G06Q 20/18 (2012.01)
H04L 9/06 (2006.01)

(58) Field of Classification Search
USPC .......... 705/16, 21, 59, 71; 380/44, 262, 278, 380/279
See application file for complete search history.

(56) References Cited

U.S. PATENT DOCUMENTS

| | | |
|---|---|---|
| 2015/0262137 A1 | 9/2015 | Armstrong |
| 2016/0098730 A1 | 4/2016 | Feeney |
| 2016/0275461 A1 | 9/2016 | Sprague et al. |
| 2016/0292672 A1 | 10/2016 | Fay et al. |
| 2017/0109735 A1 | 4/2017 | Sheng et al. |
| 2017/0132625 A1 | 5/2017 | Kennedy |
| 2017/0331896 A1 | 11/2017 | Holloway et al. |
| 2018/0197156 A1 | 7/2018 | Beesley et al. |
| 2018/0308098 A1 | 10/2018 | Ebrahimi |
| 2018/0315046 A1 | 11/2018 | Joao |
| 2019/0132350 A1 | 5/2019 | Smith et al. |
| 2019/0281259 A1 | 9/2019 | Palazzolo |
| 2020/0005267 A1* | 1/2020 | Siefken ............... G06Q 10/1091 |
| 2020/0013046 A1* | 1/2020 | Joao .................... G06Q 20/227 |

FOREIGN PATENT DOCUMENTS

| | | |
|---|---|---|
| CN | 106790431 A | 5/2017 |
| CN | 106815530 A | 6/2017 |
| CN | 107615317 A | 1/2018 |
| CN | 107819777 A | 3/2018 |
| CN | 107944868 A | 4/2018 |
| EP | 3502871 A1 | 6/2019 |
| JP | 6364132 B2 | 7/2018 |
| JP | 2019500675 A | 1/2019 |
| KR | 101701131 B1 | 2/2017 |
| WO | 2019061630 A1 | 4/2019 |

OTHER PUBLICATIONS

Written Opinion and International Search Report for PCT Application No. PCT/US2019/063783 dated Apr. 30, 2020.
Lukas Marx, "Storing Data on the Blockchain," Jul. 5, 2018.
Vitalik Buterin, "Privacy on the Blockchain," Jan. 15, 2016.

* cited by examiner

BLOCKCHAIN-BASED RECORDKEEPING METHOD AND APPARATUS

CROSS REFERENCE TO RELATED APPLICATION

The present application is based on and claims priority to Chinese Patent Application No. 201811641062.5, filed on Dec. 29, 2018, which is incorporated herein by reference in its entirety.

TECHNICAL FIELD

This specification relates to the field of data processing technologies, and in particular, to a blockchain-based recordkeeping method and apparatus.

BACKGROUND

Blockchain, also known as a distributed ledger technology, is an emerging technology in which multiple computing devices participate in "accounting" to maintain a complete distributed database jointly. The blockchain technology is decentralized and transparent, each computing device can participate in maintaining records in the database, and data can be quickly synchronized among the computing devices. With the aforementioned characteristics, the blockchain technology has been widely applied in many fields.

SUMMARY

One or more embodiments of this specification provide a computer-implemented method for blockchain-based recordkeeping. The method may include: obtaining first record information, wherein the first record information is generated based on identification information of a target buyer; receiving second record information, wherein the second record information is generated based on purchase live stream data associated with the target buyer; generating a target transaction based on the first record information and the second record information; and sending the target transaction to a distributed database of a blockchain, for the target transaction to be recorded in the distributed database of the blockchain in response to the target transaction being verified by nodes of the blockchain based on a consensus.

In some embodiments, the method is implementable by a self-service vending terminal. In some embodiments, the self-service vending terminal is a node of the blockchain.

In some embodiments, the blockchain is a consortium blockchain, and the method is implementable by a self-service vending terminal which is a consortium member node of the consortium blockchain.

In some embodiments, the identification information of the target buyer comprises biometric recognition information of the target buyer or real-name information of the target buyer.

In some embodiments, the purchase live stream data records a purchase process conducted by the target buyer. In some embodiments, the purchase live stream data comprises video data and audio data.

In some embodiments, the target transaction comprises plaintext of the first record information and plaintext of the second record information.

In some embodiments, the target transaction comprises ciphertext of the first record information and ciphertext of the second record information.

In some embodiments, the target transaction comprises a first hash digest of the first record information and a second hash digest of the second record information.

In some embodiments, the target transaction comprises a hash digest generated based on the first record information and the second record information jointly.

In some embodiments, the method further includes: obtaining third record information, wherein the third record information is generated based on transaction payment information of the target buyer; and wherein generating a target transaction based on the first record information and the second record information comprises: generating the target transaction based on the first record information, the second record information, and the third record information.

In some embodiments, the target transaction comprises a hash digest of the identity information of the target buyer, the purchase process live stream data associated with the target buyer, and the transaction payment information of the target buyer jointly.

In some embodiments, the consensus is based on a Proof of Work (PoW) mechanism, a Delegated Proof of Stake (DPoS) mechanism, a Proof of Stake (PoS) mechanism, a Practical Byzantine Fault Tolerance (PBFT) consensus algorithm, or a RAFT consensus algorithm.

One or more embodiments of the specification further provide an apparatus for blockchain-based recordkeeping. The apparatus may include: comprising one or more processors and one or more non-transitory computer-readable memories coupled to the one or more processors and configured with instructions executable by the one or more processors to cause the system to perform operations comprising: obtaining first record information, wherein the first record information is generated based on identification information of a target buyer; receiving second record information, wherein the second record information is generated based on purchase live stream data associated with the target buyer; generating a target transaction based on the first record information and the second record information; and sending the target transaction to a distributed database of a blockchain, for the target transaction to be recorded in the distributed database of the blockchain in response to the target transaction being verified by nodes of the blockchain based on a consensus.

One or more embodiments of the specification further provide a non-transitory computer-readable storage medium configured with instructions executable by one or more processors to cause the one or more processors to perform operations comprising: obtaining first record information, wherein the first record information is generated based on identification information of a target buyer; receiving second record information, wherein the second record information is generated based on purchase live stream data associated with the target buyer; generating a target transaction based on the first record information and the second record information; and sending the target transaction to a distributed database of a blockchain, for the target transaction to be recorded in the distributed database of the blockchain in response to the target transaction being verified by nodes of the blockchain based on a consensus.

According to the blockchain-based recordkeeping method and apparatus provided in this specification, a self-service vending terminal is configured as a blockchain node of the blockchain, and based on a distributed database storage mechanism of the blockchain technology, identification information of a buyer and purchase process live stream data captured by a monitor terminal are recorded in a distributed database of the blockchain as records, and are maintained by blockchain nodes jointly and synchronized in real time; all the records are traceable. Moreover, based on a consensus mechanism of the blockchain, the records will not be tampered with after being recorded, thereby ensuring the authenticity and security of the records. Thus, the records provide a valid data basis for judicial forensics or other applications.

DETAILED DESCRIPTION OF THE APPLICATION

Figure 1:
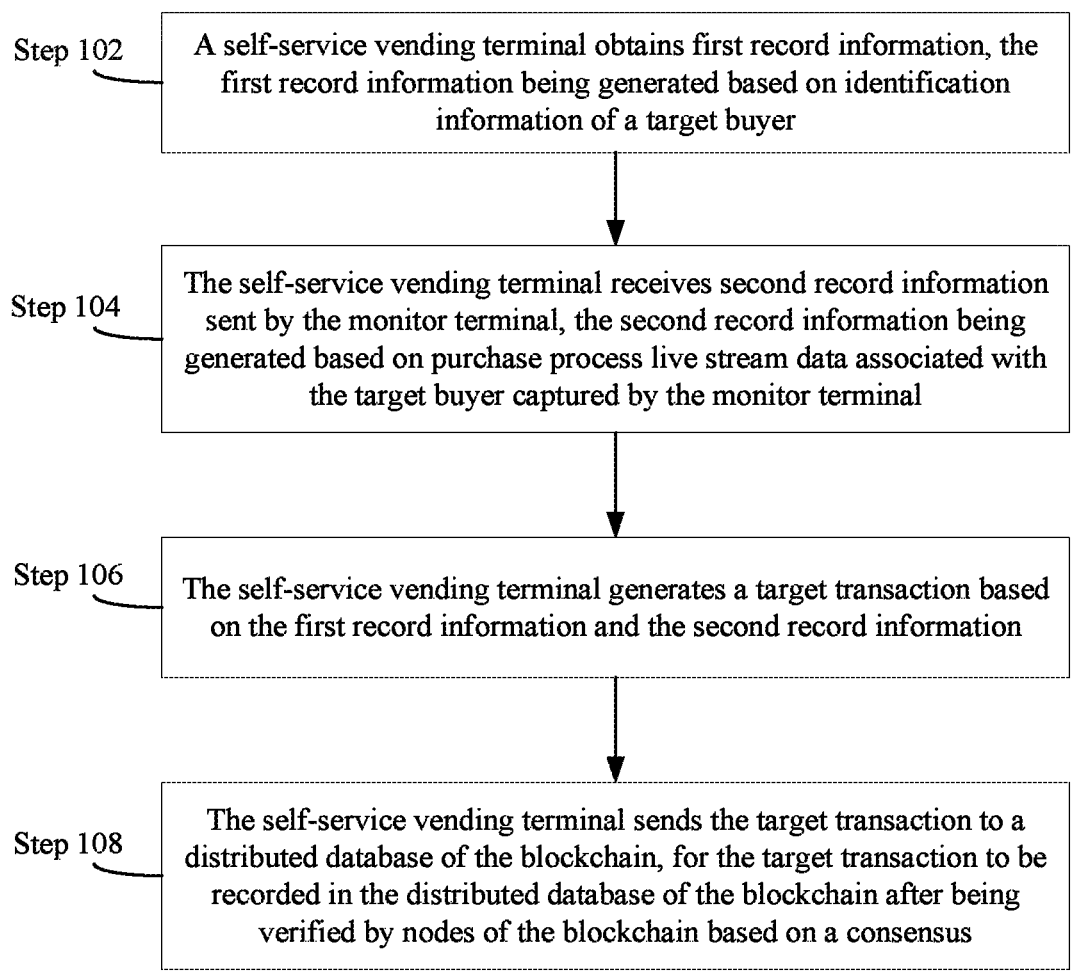
FIG. 1 is a schematic flowchart of a blockchain-based recordkeeping method according to some embodiments of this specification.

Embodiments of the specification will be described in detail, examples of which are illustrated in the accompanying drawings. In the following description involving the accompanying drawings, the same numbers in different drawings represent the same or similar elements unless otherwise indicated. The implementations set forth in the following description of embodiments do not represent all implementations consistent with the one or more embodiments of this specification. Instead, they are merely examples of apparatuses and methods consistent with some aspects related to the one or more embodiments of this specification as recited in the appended claims.

In other embodiments, steps of methods are not necessarily performed according to the sequence shown and described in this specification. In some other embodiments, the methods may include more or fewer steps than those described in this specification. In addition, a single step described in this specification may be split into multiple steps for description in other embodiments. Multiple steps described in this specification may be combined into a single step for description in still other embodiments.

Currently, malicious damage, goods stealing, goods missing, or other incidents often occur in self-service retails store or on self-service vending machines. Moreover, it is difficult to find evidence of such incidents, and thus the loss of merchants caused by the incidents is hard to be compensated.

Based on the technical problems described above, FIG. 1 shows a blockchain-based recordkeeping method according to some embodiments of this specification. The method is implementable by a self-service vending system; the self-service vending system may include a self-service vending terminal and a monitor terminal, and the self-service vending terminal may be configured as a blockchain node of a blockchain.

In some embodiments, the self-service vending system may be a multi-terminal system used for self-service vending, and may be applied to various self-service vending situations, such as in a self-service vending machine, and in a self-service vending store. For example, the self-service vending system may include a self-service vending terminal and a monitor terminal. The self-service vending terminal may integrate functional modules or hardware apparatuses for goods shipping and receiving, payment and settlement, and the like. Alternatively, the self-service vending terminal may be communicatively connected with a goods cabinet terminal, a payment and settlement terminal, and the like, of the self-service vending system, to obtain information about the goods shipping and receiving, information about the payment and settlement, etc. The monitor terminal may include an image capture terminal or a sound capture terminal disposed in a self-service vending machine or a self-service vending store. For example, the monitor terminal may be used for monitoring environment of the machine or the store, and collecting live stream data of a buyer in a purchase process.

A blockchain described in the embodiments may refer to a computer network system of blockchain nodes based on a consensus mechanism and a distributed data storage structure. The data in the blockchain is stored in multiple temporally connected "blocks," with one block containing a data digest of the preceding block in a chain. The consensus mechanism may comprise, for example, Proof of Work (PoW), Proof of Stake (PoS), Delegated Proof of Stake (DPOS), or Practical Byzantine Fault Tolerance (PBFT). Since blockchain systems operate under a corresponding consensus mechanism, the data recorded in the blockchain's database cannot be easily tampered with by individual blockchain nodes. Thus, the consensus mechanism may ensure a unified version of the stored data. In some embodiments, the data recorded in the distributed databases of the blockchain cannot be tampered with, thereby ensuring the authenticity of information recorded in the blockchain by the self-service vending terminal.

The self-service vending terminal in the embodiments may join the blockchain by following a node protocol and installing a node protocol program, so as to serve as a node of the blockchain. A node having a full data backup of the distributed database of the blockchain may be referred to as a full node, and a node having a partial data backup of the distributed database of the blockchain (for example, a backup of data of blocks' headers) may be referred to as a light node, a client, or the like. In some embodiments, the self-service vending terminal may be a full node, or a light node or client. Any device that is directly or indirectly connected into the blockchain and can send data to or obtain data from the distributed database of the blockchain can be referred to as a blockchain node (or a node) of the blockchain.

As shown in FIG. 1, the blockchain-based recordkeeping method includes the following steps 102-108.

Step 102: The self-service vending terminal obtains first record information, the first record information being generated based on identification information of a target buyer.

The identification information of the target buyer may be obtained in many manners. For example, the self-service vending terminal or an identification terminal in communicative connection with the self-service vending terminal may obtain biological identification information, for example, face information, fingerprint information, or voice print information, of the target buyer. Alternatively, the self-service vending terminal or the identification terminal may obtain identity document information of the buyer through card scanning or manual entry.

In some embodiments, the self-service vending terminal may obtain the identification information of the target buyer based on purchase payment information of the buyer. For example, the self-service vending terminal may obtain the identification information of the buyer, such as a real name, by communicating with an issuer of a payment card of the buyer or service terminals having mobile payment applications (such as WeChat Pay or Alipay). The self-service vending terminal identifies the buyer based on the identification information of the buyer, and generates the first record information based on the identification information.

Therefore, the self-service vending terminal may obtain the first record information that is generated by itself and based on the obtained identification information of the target buyer. Alternatively, the self-service vending terminal may obtain, through communication with other identification terminals, the first record information generated by the other identification terminals.

Because identification information of a user is usually private, if a plaintext copy of the identification information of the target buyer is recorded in the distributed database of the blockchain, all other nodes (e.g., nodes other than the self-service vending terminal) can obtain the plaintext of the identification information of the buyer, which may cause a security risk of identity information leakage. Therefore, the first record information in the foregoing embodiments may include one or more types of the following information: a plaintext or plaintext of the identification information of the buyer, or a ciphertext of the identification information of the buyer, or a hash digest of the identification information of the buyer. By encrypting the identification information or converting the identification information into a hash digest, the identification information can be recorded and also concealed.

Step 104: The self-service vending terminal receives second record information sent by the monitor terminal, the second record information being generated based on purchase process live stream data associated with the target buyer captured by the monitor terminal.

The purchase process live stream data associated with the target buyer may include live stream data recording an entire process of a purchase conducted by the target buyer, or live stream data showing a part of a purchase process of the target buyer. The monitor terminal may generate the second record information based on the purchase process live stream data of the target buyer.

In some embodiments, the second record information may include the purchase live stream data associated with the target buyer. In other embodiments, because video or audio data contained in the live stream data usually occupies a large storage space, to avoid transmitting a large amount of data from the monitor terminal to the self-service vending terminal, the monitor terminal may compress the captured purchase process live stream data of the target buyer, or perform a hash operation on the captured purchase process live stream data of the target buyer, to generate the second record information. The monitor terminal sends the second record information, which has a smaller volume, to the self-service vending terminal.

Step 106: The self-service vending terminal generates a target transaction based on the first record information and the second record information.

Transactions described in this specification refers to a piece of data that is created by a node of a blockchain and to be submitted to a distributed database of the blockchain. Transactions in the blockchain may be classified into transactions in a narrow sense and transactions in a broad sense. In a narrow sense, a transaction refers to a value transfer submitted by a user to the blockchain. For example, in a Bitcoin blockchain network, a transaction may be a Bitcoin transfer initiated by a user in the Bitcoin blockchain network. In a broad sense, a transaction may refer to business data submitted by a user to the blockchain. For example, data that is submitted by the self-service vending terminal to the blockchain and used for recording the purchase process of the target buyer in the foregoing embodiments may be referred to as a transaction. The self-service vending terminal or other nodes may arrange the first record information and the second record information according to a preset transaction data format, so as to convert the first record information and the second record information into a transaction.

The target transaction may include any format of content. For example, the target transaction may include plaintext of the first record information and plaintext of the second record information, or include ciphertext of the first record information and ciphertext of the second record information, or include hash digests generated from the first record information and the second record information respectively, or include a hash digest generated based on the first record information and the second record information jointly, and the like. Based on the target transaction generated from the first record information and the second record information, the first record information and the second record information can be traced back, and the identification information of the target buyer and the purchase process live stream data of the target buyer can then be traced back from the first record information and the second record information. Therefore, behaviors of the target buyer in the self-service vending process are recorded and can be retrieved and used as proof.

In some embodiments, the self-service vending terminal may further obtain third record information. For example, the third record information may be generated based on transaction payment information of the target buyer. In some embodiments, the self-service vending terminal generates the third record information based on the obtained transaction payment information of the target buyer. Alternatively, in communication with a transaction payment and settlement terminal, the self-service vending terminal may receive the third record information that is generated by the transaction payment and settlement terminal based on the transaction payment information of the target buyer. Other ways of obtaining the third record information are possible.

The transaction payment information may include content such as purchased goods, unit prices of the goods, a total payment for the goods, a payment method of the target buyer, etc. Similarly, the third record information may include one or more types of the following information: plaintext of the transaction payment information, ciphertext of the transaction payment information, or a hash digest of the transaction payment information.

In some embodiments, the target transaction may be generated based on the first record information, the second record information, and the third record information. For example, the target transaction may include plaintext of the first record information, plaintext of the second record information, and plaintext of the third record information. In another example, the target transaction may include ciphertext of the first record information, ciphertext of the second record information, and ciphertext of the third record information. In still another example, the target transaction may include a hash digest generated from the first record information, another hash digest generated from the second record information, and still another digest generated from the third record information. In yet another example, the target transaction may include a hash digest generated from the first record information, the second record information, and the third record information jointly, or the like.

Step 108: The self-service vending terminal sends the target transaction to a distributed database of the blockchain, for the target transaction to be recorded in the distributed database of the blockchain after being verified by nodes of the blockchain based on a consensus.

In some embodiments, a detailed process of uploading the target transaction to the distributed database of the blockchain may be set according to a consensus mechanism and a transaction rule of the blockchain. For example, the process of uploading the target transaction to the distributed database of the blockchain includes the following steps. Nodes having a bookkeeping authority in the blockchain add the target transaction to a candidate block. A consensus bookkeeping node (or bookkeeper) satisfying a consensus mechanism of the blockchain is determined from the nodes having a bookkeeping authority. The consensus bookkeeper broadcasts the candidate block to other nodes of the blockchain. After the candidate block passes verification of a preset quantity of the nodes of the blockchain, the candidate block is added to the distributed database of the blockchain as a new block.

In the foregoing embodiments, the nodes having a bookkeeping authority may refer to nodes having an authority of generating candidate blocks. According to the consensus mechanism of the blockchain, a consensus bookkeeper may be determined from the nodes having an authority of generating candidate blocks. The consensus mechanism may include a Proof of Work (PoW) mechanism, a Proof of Stake (PoS) mechanism, a Delegated Proof of Stake (DPoS) mechanism, or the like.

Similar to the PoW mechanism, the PoS and DPoS consensus mechanisms are both consensus algorithms commonly used for determining a consensus bookkeeping node in a public blockchain. In some embodiments, in order to reduce the time spent on confirming a transaction or data, improve transaction throughput, and meet requirements on security and performance, the blockchain may be constructed by using a consortium blockchain architecture. The foregoing self-service vending terminal (or referred to as a node), an institution that regulates related services, a judicial institution, or the like, may be used as a preselected consortium member node of the consortium blockchain to participate in bookkeeping of the blockchain. The consensus process of the consortium blockchain is controlled by the preselected node. When more than a preset ratio (for example, 2/3) of the nodes in the blockchain network confirm a block, a transaction or data recorded in the block is deemed to be confirmed by the whole network.

In some embodiments, the consortium blockchain uses a consensus algorithm such as the PoS, Practical Byzantine Fault Tolerance (PBFT), or a RAFT consensus algorithm. For example, before each round of consensus of the blockchain begins, a primary node, e.g., the consensus bookkeeper in the foregoing embodiments, may be elected from the nodes of the blockchain (for example, a new primary node is elected in each round of consensus, and other nodes are secondary nodes). The primary node initiates verification and consensus of a transaction, and is responsible for creating a new block for the blockchain based on data of the transaction (or other target data) that is consented to.

As a consensus algorithm of the consortium blockchain provided in this specification, the PBFT algorithm has high consensus efficiency and can meet the requirement of a large volume of high-frequency transactions. For example, in some embodiments, a self-service vending terminal generates target transactions based on frequent purchase behaviors or frequent usage behaviors. Moreover, the consensus has a low time delay, satisfying the requirement of a real-time processing. Thus, the target transactions can be quickly recorded in a newly generated block of the blockchain in real time. Further, by using a trusted node in the consortium blockchain network as a preselected bookkeeping node, both security and stability can be achieved. In addition, the use of the PBFT algorithm does not consume too many computing power resources of a computer, and does not necessarily require circulation of tokens, thus achieving good usability.

Based on the recordkeeping method provided in the embodiments, a purchase behavior of a target buyer in a self-service vending store or by using a self-service vending machine can be recorded in a plurality of blockchain nodes in a decentralized manner based on a distributed database storage mechanism of the blockchain, can be jointly maintained by the blockchain nodes, and can be synchronized in real time. All the records are traceable. Moreover, based on a consensus mechanism of the blockchain, a target transaction of a buyer provided by a self-service vending terminal (or referred to as a node) cannot be tampered with after being recorded, thereby ensuring the authenticity and security of the recorded data. Accordingly, the recorded data may be used as a valid data basis for investigation and evidence collection with respect to a purchase or damage behavior of the buyer in the self-service vending store or on the self-service vending machine, or as a valid data basis for other applications, thereby protecting interests of a self-service vending operator of the store or machine.

Corresponding to the foregoing embodiments of the method, embodiments of this specification further provides a blockchain-based recordkeeping apparatus 20. The apparatus 20 may be implemented through software, hardware, or a combination of software and hardware. Using a software implementation as an example, as a logical apparatus, the apparatus 20 is formed in the following manner: a central processing unit (CPU) of a device reads corresponding computer program instructions into an internal memory, and executes the computer program instructions. At a hardware level, in addition to a CPU, an internal memory, and a storage shown in FIG. 3, a recordkeeping device where an apparatus for recordkeeping is located further includes other hardware such as a chip for sending and receiving wireless signals, and/or other hardware such as a board for implementing network communications.

Figure 2:
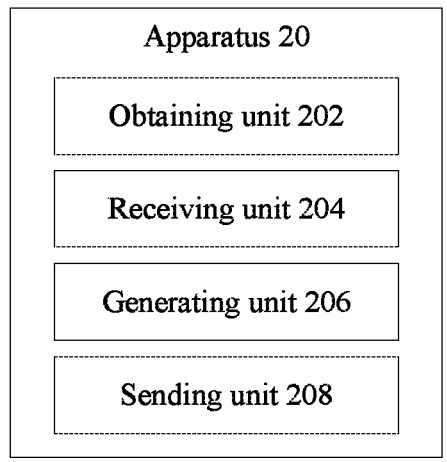
FIG. 2 is a schematic diagram of a self-service vending apparatus based on a blockchain according to some embodiments of this specification.

FIG. 2 shows a schematic diagram of a blockchain-based recordkeeping apparatus 20 according to some embodiments of this specification. The apparatus 20 is implementable by a self-service vending system. The self-service vending system includes a self-service vending terminal and a monitor terminal, and the self-service vending terminal is a node of a blockchain. As shown in FIG. 2, the apparatus 20 includes: an obtaining unit 202, configured to obtain first record information, the first record information being generated based on identification information of a target buyer; a receiving unit 204, configured to receive second record information sent by the monitor terminal, the second record information being generated based on purchase live stream data associated with the target buyer captured by the monitor terminal; a generating unit 206, configured to generate a target transaction based on the first record information and the second record information; and a sending unit 208, configured to send the target transaction to a distributed database of the blockchain, for the target transaction to be recorded in the distributed database of the blockchain after being verified by nodes of the blockchain based on a consensus.

In some embodiments, the identification information of the target buyer includes biometric recognition information of the target buyer or real-name information of the target buyer.

In some embodiments, the monitor terminal includes a video monitor terminal or an audio monitor terminal. In some embodiments, the obtaining unit 202 is further configured to obtain third record information, the third record information being generated based on transaction payment information of the target buyer; and the target transaction is generated based on the first record information, the second record information, and the third record information.

In some embodiments, the target transaction includes a hash digest of the identity information of the target buyer, the purchase process live stream data associated with the target buyer, and the transaction payment information of the target buyer jointly. In some embodiments, the blockchain is a consortium blockchain; and the self-service vending terminal is a consortium member node of the consortium blockchain.

For implementation processes of the functions and effects of the units in the apparatus 20, refer to the implementation processes of the corresponding steps in the foregoing method. For similar parts, reference may be made to related descriptions in the method embodiments. Details are not elaborated herein again.

The apparatus embodiments described above are merely schematic. The units described as separate parts may or may not be physically separate, and the parts displayed as units may or may not be physical modules, may be located in one module, or may be distributed on multiple network modules. Some or all of the units or modules may be selected according to actual needs to achieve some or all objectives of the embodiments of this specification. Those of ordinary skill in the art should understand and implement this specification without creative efforts.

The apparatus, units and modules illustrated in the foregoing embodiments may be implemented by a computer chip or an entity, or implemented by a product having a function. A typical implementation device is a computing device, and examples of the computing device may include a personal computer, a laptop computer, a cellular phone, a camera phone, a smartphone, a personal digital assistant, a media player, a navigation device, an email sending and receiving device, a game console, a tablet computer, or a wearable device, or a combination of any of these devices.

Figure 3:
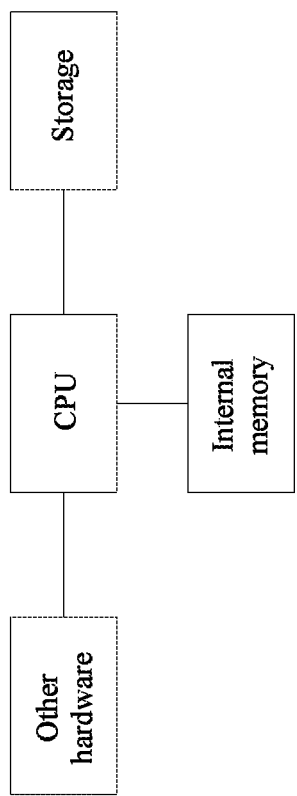
FIG. 3 is a structural diagram of a hardware implementing a blockchain-based recordkeeping method according to some embodiments of this specification.

Corresponding to the foregoing embodiments of the method, this specification further provides a computing device. As shown in FIG. 3, the computing device includes a memory and a processor. The memory stores computer programs operable by the processor. When the processor operates the stored computer programs, the processor performs the steps of the blockchain-based recordkeeping method performed by the self-service vending terminal (or the node) in the embodiments of this specification. For the detailed description of the steps of the blockchain-based recordkeeping method performed by the self-service vending terminal (or the node), refer to related content above, and the description is not repeated.

Corresponding to the foregoing embodiments of the method, this specification further provides a computer readable storage medium. The storage medium stores computer programs. When the computer programs are executed by a processor, steps of the blockchain-based recordkeeping method performed by the self-service vending terminal (or the node) in the embodiments of this specification are performed. For the detailed description of the steps of the blockchain-based recordkeeping method performed by the self-service vending terminal (or the node), refer to the related content above, and the description is not repeated.

The foregoing descriptions are merely some embodiments of this specification, but are not intended to limit this specification. Any modification, equivalent replacement, or improvement made within the spirit and principle of this specification shall fall within the protection scope of this specification.

In a typical configuration, the computing device includes one or more processors (CPUs), an input/output interface, a network interface, and a memory. The memory may include a volatile memory, a random access memory (RAM), and/or a non-volatile memory in a computer readable medium, such as a read-only memory (ROM) or a flash memory (flash RAM). The memory is an example of the computer readable medium.

The computer readable medium includes volatile and non-volatile, removable and non-removable media, which may store information by using any methods or technologies. The information may include computer readable instructions, data structures, program modules, or other data. The examples of the computer storage medium include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storages, a cassette, a tape, disk storage, or other magnetic storage devices, or any other non-transmission media, which may be configured to store information that may be accessible by a computing device. According to the descriptions in this specification, the computer readable medium does not include transitory computer readable media (transitory media), such as a modulated data signal and carrier.

It should be further noted that, the terms "include," "comprise," and any variants thereof are intended to cover a non-exclusive inclusion. Therefore, in the context of a process, a method, a commodity, or a device that includes a series of elements, the process, method, commodity or device not only includes such elements, but also includes other elements not specified expressly, or may include elements inherent to the process, method, commodity or device. Without more restrictions, an element limited by "include a/an . . . " does not exclude other same elements existing in the process, method, commodity or device that includes the element.

Those skilled in the art should understand that the embodiments of this specification may be provided as a method, a system, or a computer program product. Therefore, the embodiments of this specification may use a form of hardware-only embodiments, software-only embodiments, or embodiments combining software and hardware. Moreover, the embodiments of this specification may use a form of a computer program product that is implemented on one or more computer-usable storage media (including, but not limited to, a disk memory, a CD-ROM, an optical memory, and the like) that include computer-readable program codes.

What is claimed is:

1. A computer-implemented method for blockchain-based recordkeeping implemented by a self-service vending system that comprises a self-service vending terminal and a monitor terminal, comprising:

obtaining, by an obtaining unit of the self-service vending terminal, identification information of a target buyer;

generating, by the obtaining unit of the self-service vending terminal, first record information, wherein generating the first record information comprises encrypting the obtained identification information of the target buyer;

capturing, by the monitoring terminal, live video and/or audio data for at least a part of a purchase process of the target buyer;

generating, by the monitoring terminal, second record information, wherein generating the second record information comprises compressing the live video and/or audio data associated with the target buyer;

sending, by the monitoring terminal to a receiving unit of the self-service vending terminal, the generated second record information;

generating, by the obtaining unit of the self-service vending terminal, third record information based on transaction payment information of the target buyer;

generating, by a generating unit of the self-service vending terminal, a hash digest from the first record information, the second record information, and the third record information;

generating, by the generating unit of the self-service vending terminal, a target transaction including the hash digest; and recording, by the self-service vending terminal, the target transaction in a blockchain, wherein the recording comprises:
adding the target transaction to a candidate block, and
broadcasting the candidate block to a plurality of blockchain nodes of the blockchain.

2. The method according to claim 1, wherein the blockchain is a consortium blockchain, and wherein the self-service vending terminal is a consortium member node of the consortium blockchain.

3. The method according to claim 1, wherein the identification information of the target buyer comprises biometric recognition information of the target buyer or real-name information of the target buyer.

4. A self-service vending system for blockchain-based recordkeeping, comprising a self-service vending terminal and a monitoring terminal that comprise one or more processors and one or more non-transitory computer-readable memories coupled to the one or more processors and configured with instructions executable by the one or more processors to cause the self-service vending system to perform operations comprising:

obtaining, by an obtaining unit of the self-service vending terminal, identification information of a target buyer;

generating, by the obtaining unit of the self-service vending terminal, first record information, wherein generating the first record information comprises encrypting the obtained identification information of the target buyer;

capturing, by the monitoring terminal, live video and/or audio data for at least a part of a purchase process of the target buyer;

generating, by the monitoring terminal, second record information, wherein generating the second record information comprises compressing the live video and/or audio data associated with the target buyer;

sending, by the monitoring terminal to a receiving unit of the self-service vending terminal, the generated second record information;

generating, by the obtaining unit of the self-service vending terminal, third record information based on transaction payment information of the target buyer;

generating, by a generating unit of the self-service vending terminal, a hash digest from the first record information, the second record information, and the third record information;

generating, by the generating unit of the self-service vending terminal, a target transaction including the hash digest; and recording, by the self-service vending terminal, the target transaction in a blockchain, wherein the recording comprises:
adding the target transaction to a candidate block, and
broadcasting the candidate block to a plurality of blockchain nodes of the blockchain.

5. One or more non-transitory computer-readable storage media containing instructions that, when executed by one or more processors, cause the one or more processors to perform the steps of:

obtaining, by an obtaining unit of a self-service vending terminal, identification information of a target buyer;

generating, by the obtaining unit of the self-service vending terminal, first record information, wherein generating the first record information comprises encrypting the obtained identification information of the target buyer;

capturing, by a monitoring terminal, live video and/or audio data for at least a part of a purchase process of the target buyer;

generating, by the monitoring terminal, second record information, wherein generating the second record information comprises compressing the live video and/or audio data associated with the target buyer;

sending, by the monitoring terminal to a receiving unit of the self-service vending terminal, the generated second record information;

generating, by the obtaining unit of the self-service vending terminal, third record information based on transaction payment information of the target buyer;

generating, by a generating unit of the self-service vending terminal, a hash digest from the first record information, the second record information, and the third record information;

generating, by the generating unit of the self-service vending terminal, a target transaction including the hash digest; and recording, by the self-service vending terminal, the target transaction in a blockchain, wherein the recording comprises:
adding the target transaction to a candidate block, and
broadcasting the candidate block to a plurality of blockchain nodes of the blockchain.

6. The system according to claim 4, wherein the blockchain is a consortium blockchain, and wherein the self-service vending terminal is a consortium member node of the consortium blockchain.

7. The system according to claim 4, wherein the identification information of the target buyer comprises biometric recognition information of the target buyer or real-name information of the target buyer.

8. The media according to claim 5, wherein the blockchain is a consortium blockchain, and wherein the self-service vending terminal is a consortium member node of the consortium blockchain.

9. The media according to claim 5, wherein the identification information of the target buyer comprises biometric recognition information of the target buyer or real-name information of the target buyer.

10. The method according to claim 1, wherein the self-service vending terminal is a blockchain node in a computer network system of the blockchain.

11. The system according to claim 4, wherein the self-service vending terminal is a blockchain node in a computer network system of the blockchain.

12. The media according to claim 5, wherein the self-service vending terminal is a blockchain node in a computer networksystem of the blockchain.

* * * * *